United States Patent [19]
Katzer

[11] Patent Number: 6,073,975
[45] Date of Patent: Jun. 13, 2000

[54] METHOD OF FABRICATING A HOLLOW BODY AND A HOLLOW BODY

[75] Inventor: Dieter Katzer, Damme, Germany

[73] Assignee: Hansgrohe AG, Schiltach, Germany

[21] Appl. No.: 09/008,797

[22] Filed: Jan. 20, 1998

[30] Foreign Application Priority Data

Jan. 22, 1997 [DE] Germany ............ 197 02 087

[51] Int. Cl.⁷ .................................................. B01F 5/06
[52] U.S. Cl. ........................... 285/123.1; 366/340
[58] Field of Search ..................... 366/181.5, 340; 138/42, 44; 285/123.1, 124.1, 915; 165/DIG. 162

[56] References Cited

U.S. PATENT DOCUMENTS

| | | | |
|---|---|---|---|
| 390,927 | 10/1888 | Webster | 261/8 |
| 2,069,630 | 2/1937 | Steenstrup | 138/42 |
| 2,085,132 | 6/1937 | Underwood | 366/340 |
| 3,409,274 | 11/1968 | Lawton | 366/340 X |
| 3,949,186 | 4/1976 | Nakayama et al. | 219/121 |
| 4,376,885 | 3/1983 | Smirra | 219/121 |
| 4,593,448 | 6/1986 | Aggradi et al. | 29/523 |
| 4,603,089 | 7/1986 | Bampton | 428/593 |
| 4,610,393 | 9/1986 | Rodriguez | 236/12.15 |
| 4,741,562 | 5/1988 | McGregor | 285/915 X |

FOREIGN PATENT DOCUMENTS

| | | |
|---|---|---|
| 0 647 808 | 4/1995 | European Pat. Off. . |
| 0 694 352 | 1/1996 | European Pat. Off. . |
| 0 716 257 | 6/1996 | European Pat. Off. . |
| 1536140 | 8/1968 | France ............ 138/42 |
| 1777174 | 7/1971 | Germany . |
| 3509217 | 4/1986 | Germany . |
| 3941106 | 5/1991 | Germany . |
| 4438647 | 5/1996 | Germany . |
| 4428875 | 10/1996 | Germany . |
| 0 429 7689 | 5/1994 | Japan . |
| 0 434 3031 | 7/1994 | Japan . |

OTHER PUBLICATIONS

Shigley et al, Mechanical Engineering Design, McGraw Hill, New York, p. 412, 1983.

Primary Examiner—Terry Lee Melius
Assistant Examiner—Greg Binda
Attorney, Agent, or Firm—Duane, Morris & Heckscher LLP

[57] ABSTRACT

A hollow body and method for making the same are proposed for a sanitary fitting such as a mixing valve for hot and cold water lines. The hollow body may be fabricated as a simple sheet material part and contains water guides in its interior. The water guides are produced by inserting a simple sheet material part into the interior of the hollow body. The sheet material part is fixed in place and subsequently welded to the inner side of the hollow body. Welding can be done more particularly with the aid of a laser enabling the weld to be made from the outer side of the hollow body, as a result of which, welds can be produced at positions which would otherwise not be accessible.

4 Claims, 1 Drawing Sheet

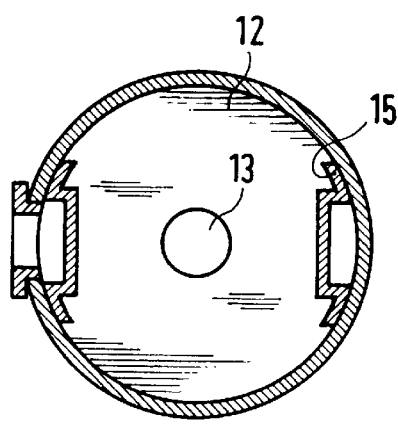
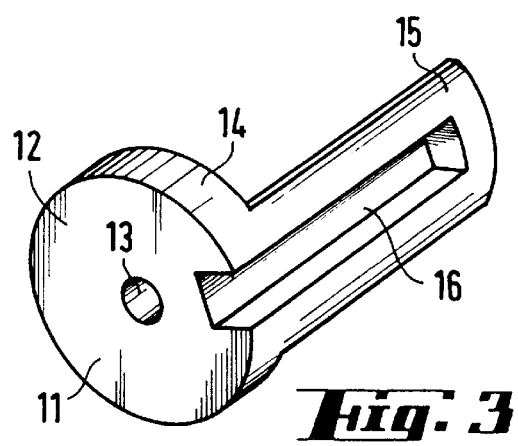
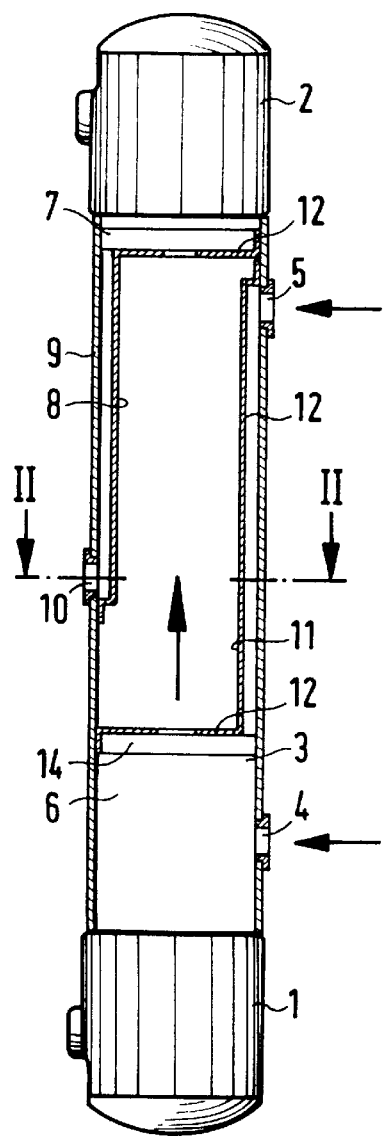
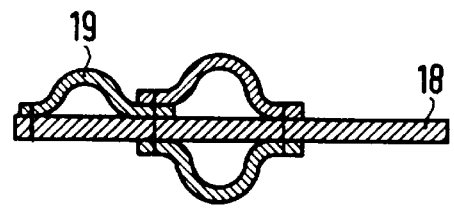

METHOD OF FABRICATING A HOLLOW BODY AND A HOLLOW BODY

BACKGROUND OF THE INVENTION

1. Field of the Invention

The invention relates to a hollow body for a sanitary fitting and method for making same. and a hollow body.

2. Description of the Prior Art

Sanitary fittings typically include a base body made of brass, comprising therein mounts for valve parts, water guides or the like. These water guides requiring machining, more particularly drilling, as a result of which such base bodies have a relatively high price.

For simplifying such a base body in making it cheaper it is already known to make use of tubestock as the body blank and to insert the individual parts into the tube.

SUMMARY OF THE INVENTION

The invention is based on the object of defining a method for cost effective fabrication of a multi-part hollow body and a hollow body fabricated thereby.

To achieve this object the invention proposes a method comprising the steps: fabricating said hollow body as an outer shell, producing at least one insert part, inserting the insert part in the interior of the outer shell, fixing the insert part in place at least temporarily therein and securing the insert part non-destructively through the outer shell to the inner side thereof. The invention further proposes a hollow body, more particularly a sanitary fitting comprising an outer shell, at least one insert part arranged in the interior of the outer shell and connected non-destructively to the inner side of the outer shell from the outside. Further aspects of the invention are the subject matter of the sub-claims.

In this arrangement the outer shell may already be fabricated of a material which is thin as such and which is formed into the outer shell by a method suitable to the material. Such thin material is termed sheet material in the following and although this may be sheet metal it must not necessarily be of metal, it being just as possible, for example, to fabricate an outer shell as a hollow body of a plastics material which is, for instance, blow molded or deep drawn.

The insert part applied to the hollow body by being applied from the outer side through the sheet material of the outer shell non-destructively need not necessarily consist of a sheet material. It may be, for example, a solid part, for instance a threaded bush or the like which can be applied from the outer side.

More particularly, however, the method can be made use of to apply a water guide to the interior of the hollow body, the insert part being employed for this purpose. Here too, an insert part of sheet material may be involved.

The thickness of the sheet material for the outer shell depends on the method employed.

The method can be made use of, more particularly, to fabricate a sanitary fitting or, to put it better, the housing for a sanitary fitting.

Thus, in accordance with the invention a low cost sheet material is employed not only for fabricating the base body but also for fabricating the water guides to be incorporated in the interior of the sheet material part as single sheet material insert parts. These can be fabricated by simple means, inserted in the tube where they are connected to the outer shell after being temporarily fixed in place.

In one aspect of the invention at least one water guide may be formed between an insert part and the outer shell, thus making it possible to work with flat sheet material as the starting material, i.e. not using any tubestock having a closed cross-section for the insert parts.

It is likewise possible that at least one water guide can be formed between two insert parts, as a result of which even tubes can be simulated by plain sheet materials.

However, it is also possible that at least one water guide can be formed by an insert part closed in cross-section.

In another aspect of the invention an insert part may be formed troughed. This trough can be formed into a passage by being supplemented with a sheet part to which it is secured.

More particularly it may be provided for that an insert part is provided with a bead. For example, a tube can be supplemented by insertion of a second tube the outer diameter of which is the same as the inner diameter of the outer tube so that when the inner tube comprises a bead jutting inwards a passage materializes between the bead and the outer tube.

For fabricating the insert parts, more particularly with beads or troughs, deep drawing may be employed in accordance with the invention, deep drawing enabling sheet material parts to be fabricated in a wide range of different shapes, whereby the sheet material parts may be curved in two dimensions.

For producing a connection between two water guides it may be provided for in accordance with the invention that several single parts are welded to each other before or after they are inserted into the outer shell.

More particularly it may be provided for also that a connection is made by laminating the sheet material.

Welding with the aid of a laser has turned out to be a particularly favorable means of connection. One such weld can be made from the outer side of the outer shell therethrough, thus also making it possible to produce a connection at positions otherwise non-accessible.

A further type of connection proposed by the invention is an electron beam weld or also an ultrasonic weld which can be put to use more particularly in the case of a plastics sheet material.

The hollow body proposed by the invention is more particularly to advantage a sanitary fitting, such as a mixer valve, for example. By fabricating the outer shell as a sheet material part the development engineer now has a wealth of different shapes to choose from.

As regards the hollow body it may be provided for that the water guide is formed at least in part between an insert part and the outer shell.

However, it is just as possible that the water guide is formed at least in part by an insert part having a closed cross-section. For example, a prefabricated tube of sheet material may also be inserted into the outer shell.

In a further aspect of the invention the water guide is formed at least in part between two insert parts.

More particularly it may be provided for that the connection between the insert parts and the outer shell as well as, where necessary, between the individual insert parts is a weld, more particularly a laser weld.

In accordance with the invention it may be provided for that the weld is undertaken from the outer side of the outer shell therethrough, this being possible in the case of laser welds.

For facilitated installation and implementation of welding it may be provided for in accordance with the invention that one insert part is shaped such that it can be fixed in place simply by its shape alone in the interior of the outer shell.

In accordance with the invention it may be provided for that an insert part is deep drawn. Another possibility would be to shape the item by internal high pressure.

In accordance with the invention an insert part may comprise a bead forming part of a water guide.

For producing a connection between several water guides a drilled passage may be provided for in accordance with the invention.

For fabricating more complicated parts several insert parts may be connected more particularly laminated with each other and/or to the outer shell.

In accordance with the invention it may be provided for also that one insert part exclusively serves a reinforcement purpose, i.e. not forming part of a water guide.

In making fabrication even cheaper it may be provided for that the outer shell comprises several identical insert parts which may be arranged symmetrically to each other, for example.

More particularly it may be provided for that one insert part adjoins the outer shell and/or a second insert part sheetwise in the region of the connection which may occur by producing an edge flange.

Further features, details and benefits of the invention read from the claims, the wording of which is made with reference to the contents of the description, to the following description of a preferred embodiment of the invention and to the drawing.

BRIEF DESCRIPTION OF THE DRAWINGS

An example embodiment of the invention is explained in more detail in the following and illustrated in the drawings in which:

FIG. 1 is a side view showing a thermostatic valve partially in longitudinal section;

FIG. 2 is a cross-sectional view on a magnified scale through the valve as shown in FIG. 1;

FIG. 3 is a perspective view of an insert part for the thermostatic valve as shown in FIG. 1;

FIG. 4 is a cross-sectional view through two insert parts each provided with a bead;

FIG. 5 shows the connection of several insert parts.

DESCRIPTION OF THE PREFERRED EMBODIMENT

FIG. 1 is a view showing a thermostatic valve, this thermostatic valve being tubular in shape. Arranged at one end is a head 1 for setting the temperature. At the opposite end of the thermostatic valve is a base 2 for opening and closing the flow from the valve.

The body of the fitting comprises a circular cylindrical outer tube 3. Leading into the outer tube 3 is a port 4 for cold water and a port 5 for hot water. At the end assigned to the head 1 for setting the temperature a space 6 for a thermostatic valve is formed in the outer tube 3. Formed at the opposite end of the outer tube 3 is a space 7 for a shutoff valve.

Inserted into the outer tube 3 are two insert parts 8, 11 of a sheet material. The upper insert part 8 as shown in FIG. 1 separates a water guide 9 for the mixed water leaving the shutoff valve from the outer tube 3. The water guide 9 for the mixed water leads to a discharge port 10 which is connected to the valve discharge by ways and means not shown. An insert part 11 similar in shape separates a water guide 12 for the hot water from the outer tube 3.

Both insert parts 8, 11 contain a flat, roughly circular disk 12 having a central opening 13. The disk 12 is upswept apron-like along its edge to form a flat flange 14 with which it is in contact on the inner side of the outer tube 13. The insert part 8, 11 is welded along this flange 14 to the inner side of the outer tube 3. The weld is done with a laser which permits production of the weld from the outer side of the outer tube 3 therethrough.

The shape of the insert parts 8, 11 is best evident from FIG. 3 showing a view of such an insert part 11 in perspective. This insert part 11 is fabricated by deep drawing from a piece of sheet material. Extending from the disk element 12, surrounded by the flange 14, is a section 15 in the longitudinal direction of the tube. This section 15 contains a trough 16 which is open at its end assigned to the disk 12 and featuring a roughly rectangular cross-section. With the exception of its open end the trough 16 is surrounded on all sides by the section 15 which is located in a circular cylindrical shell surface area. The insert part 11 is inserted into the outer tube 3, the flange 14 coming into contact with the inner side of the outer tube 3. The section 15 also locates the inner side of the outer tube 2 as is evident more particularly from the cross-section view of FIG. 2. A weld likewise produced with the aid of a laser from without is also produced along the parts of the section 15 defining the trough 16 longitudinally.

In this way, with the aid of a very simple sheet material tube, namely the outer tube 3, and two simple deep drawn parts 8,11 fairly complicated forms of water guides can be fabricated in the valve.

Whilst in the case of the embodiment as shown in FIG. 1 the water guides are produced between the outer tube and the insert part 8 or 11, there is also a water guide, namely the water guide for the water leaving the thermostat in the middle portion, which is defined both by the two insert parts and by the outer tube.

FIG. 4 shows a possibility of welding two through-shaped insert parts 17 by their edges to each other in forming a tube.

FIG. 5 shows another possibility of welding several trough-shaped insert parts 19 to a flat insert part 18 in which laminated arrangements are also possible, here too, single parts being involved which are simple and cheap to fabricate and easy to connect to each other.

What is claimed is:

1. A hollow body structured for mixing hot and cold water in a sanitary fitting to provide mixed water, the hollow body comprising:

an outer shell made of sheet material and formed with a hot water inlet, cold water inlet and a mixed water outlet;

a first insert part arranged in an interior of said outer shell and connected to an inner side of said outer shell from the outer side thereof, wherein the first insert part forms a first water conduit at least partially between the first insert part and the outer shell and said hot, water inlet opens into said first water conduit;

a first chamber in fluid communication with the first water conduit, wherein the cold water inlet opens into the first chamber;

a second insert part arranged in the interior of said outer shell and connected to the inner side of said outer shell, wherein the second insert part forms a second water conduit at least partially between the second insert part and the outer shell and said mixed water outlet opens into said second water conduit, wherein the first insert part is formed with a first passage and the second insert part is formed with a second passage, said first and second passages being in fluid communication, thereby defining a third water conduit; and a second chamber, wherein second water conduit and the third water conduit are in fluid communication with the second chamber, whereby hot water when flowing through the hot water inlet into the first water conduit and into the first chamber, and cold water when flowing through the cold water inlet into the first chamber, thereby form mixed water, which mixed water flows through the third water conduit to the second chamber and the second fluid conduit and to the mixed water outlet.

2. The hollow body as set forth in claim 1, wherein the first insert part is connected to the inner side of the outer shell via one of a laser weld and an electron beam weld.

3. The hollow body as set forth in claim 1, wherein the second insert part is connected to the inner side of the outer shell via one of a laser weld and an electron beam weld.

4. The hollow body as set forth in claim 1, wherein the first insert part is connected to the inner side of the outer shell via a weld formed through to the first insert part from an outer side of the outer shell.

* * * * *